(12) United States Patent
Dehlsen et al.

(10) Patent No.: US 6,304,002 B1
(45) Date of Patent: Oct. 16, 2001

(54) DISTRIBUTED POWERTRAIN FOR HIGH TORQUE, LOW ELECTRIC POWER GENERATOR

(75) Inventors: James G. P. Dehlsen, Montecito; Geoffrey F. Deane, Santa Barbara, both of CA (US)

(73) Assignee: Dehlsen Associates, L.L.C., Santa Barbara, CA (US)

( * ) Notice: Subject to any disclaimer, the term of this patent is extended or adjusted under 35 U.S.C. 154(b) by 0 days.

(21) Appl. No.: 09/552,577

(22) Filed: Apr. 19, 2000

(51) Int. Cl.$^7$ ................................................ H02K 23/60
(52) U.S. Cl. ........................ 290/1 C; 310/75 R; 74/785
(58) Field of Search ................................. 290/1 C, 1 D, 290/42, 55; 310/83, 112; 74/661, 655

(56) References Cited

U.S. PATENT DOCUMENTS

| | | |
|---|---|---|
| 1,785,965 | 12/1930 | Major . |
| 2,463,349 | 3/1949 | Baner ................................. 172/36 |
| 3,168,665 | 2/1965 | Holper ................................ 310/112 |
| 3,477,536 * | 11/1969 | Carini ................................. 180/65 |
| 3,562,567 | 2/1971 | Carini ................................. 310/83 |
| 4,050,246 | 9/1977 | Bourquardez ........................ 60/398 |
| 4,165,468 | 8/1979 | Fry et al. ............................. 290/55 |
| 4,233,858 * | 11/1980 | Rowlett ............................... 74/675 |
| 4,274,023 * | 6/1981 | Lamprey ............................. 310/83 |
| 4,291,233 | 9/1981 | Kirschbaum ........................ 290/1 |
| 4,585,950 | 4/1986 | Lund ................................... 290/44 |
| 4,685,354 * | 8/1987 | McCabria ........................... 74/785 |
| 4,686,376 | 8/1987 | Retz .................................... 290/42 |
| 4,691,119 | 9/1987 | McCabria ........................... 307/84 |
| 4,848,188 | 7/1989 | Schumacher ....................... 74/802 |
| 4,858,490 | 8/1989 | Grant .................................. 74/661 |
| 4,862,009 * | 8/1989 | King .................................... 290/22 |
| 5,387,818 | 2/1995 | Leibowitz .......................... 290/1 R |
| 5,476,293 | 12/1995 | Yang ................................... 290/4 C |
| 5,663,600 | 9/1997 | Baek et al. .......................... 290/55 |
| 5,712,519 * | 1/1998 | Lamb .................................. 310/75 |
| 5,976,047 | 11/1999 | Woytaszek ......................... 475/149 |
| 6,118,194 * | 9/2000 | Kawamura ......................... 310/75 R |

FOREIGN PATENT DOCUMENTS 198 04 177    9/1998   (DE) .

* cited by examiner

Primary Examiner—Nicholas Ponomarenko
(74) Attorney, Agent, or Firm—Owen L. Lamb

(57) ABSTRACT

Wind or water currents turn a power generator rotor. A torque-dividing gearbox is coupled to an input shaft driven by the rotor. The torque-dividing gearbox has a plurality of output shafts located around a perimeter of the input shaft. A number of torque-reducing gearboxes are each coupled to a respective one of the output shafts, each one of the torque-reducing gearboxes driving a generator. In one design the torque-reducing gearboxes and generators are held stationary and the torque-dividing gearbox includes a bull gear turned by the input shaft. Each one of the output shafts is connected to a gear that engages the bull gear teeth. Alternatively, the torque-reducing gearboxes and generators rotate with the input shaft. The torque-dividing gearbox includes a stationary ring gear having ring gear teeth around an inner circumference. Each of the output shafts is connected to a gear that engages the ring gear teeth.

30 Claims, 5 Drawing Sheets

DISTRIBUTED POWERTRAIN FOR HIGH TORQUE, LOW ELECTRIC POWER GENERATOR

BACKGROUND OF THE INVENTION

1. Field of the Invention

This invention relates to electric power-generating devices such as wind turbines and ocean current turbines, and more particularly to a method and apparatus for distributing to various gearboxes the input torque characteristic of low rotational velocity high-torque operation of wind or water turbine blades.

2. Description of the Prior Art

Many electric power-generating devices, such as wind turbines and ocean current turbines, benefit from economies of scale, yielding lower costs for generated electricity with larger power generation per unit. This increase in power is often accompanied by a reduction in rotational velocity of the power input shaft, resulting in a large increase in torque. Because electric generators require rotational velocities tens to hundreds of times greater than the rotational velocity of the input shaft, a speed increasing gearbox is often applied between the power input shaft and the generator. Generally, torque ($\tau$) delivered by the power input shaft to the speed-increasing gearbox for such applications is given by $$\tau = P/\omega \qquad (1)$$

where P is the power and $\omega$ is the rotational velocity of the power input shaft. Costs of conventional gearboxes (planetary, helical, etc.) increase exponentially with increased torque, diminishing the beneficial effects of increased scale. In addition, such high torque gearboxes must generally be custom designed and manufactured for specific application, further increasing their costs.

It is desirable to provide a way of reducing the torque on gearboxes resulting from slow moving turbine blades.

Prior art shows several inventions with multiple motors driving a single power output shaft, an application significantly different than the present application. Electric generating systems have been shown in the art to use multiple generators powered by a single gearbox. In each invention, the division of this power generating capacity to the multiple generators is done for power quality considerations. Division of gearboxes is becoming rare in recent commercial applications, largely because the cost of many small generators often exceeds the cost of a single large generator with the same capacity.

In addition, as turbines grow in size, the size and weight of individual components grow as well. Wind turbines place these components on top of a tower, presently stretching to over 60 m above the ground, while ocean current turbines are located at sea, where they can only be accessed by boat. The size of the components necessitates very large lifting equipment, making both the land-based cranes and ocean lifting equipment extremely costly. It is desirable to provide a way of reducing the weight and size of individual components of electricity generating equipment.

By dividing the powertrain into smaller components, generating systems receive an element of redundancy. For example, when ten small gearboxes and generators split the system's load, if one gearbox or generator experiences a fault, the system's capacity may only be reduced by 10%, allowing the system to remain active. A single set of components loses all of its capacity when a single component experiences a fault. It is desirable to provide a way of establishing reliability through redundancy in generating systems.

SUMMARY OF THE INVENTION

Briefly, in accordance with the invention, an electric power-generating device comprises a rotor which revolves in response to an external source of mechanical energy to which is coupled a main power input shaft. A torque-dividing gearbox is coupled to the main power input shaft and a plurality of torque-reducing gearboxes, each driving a generator and each having an input shaft, are connected to the torque-dividing gearbox. The plurality of torque-reducing gearboxes are located around a perimeter of the main power input drive shaft.

In accordance with an embodiment of the present invention, a powertrain for wind turbines and ocean current turbines consists of a large, input power shaft-mounted, rotating bull-gear with stationary smaller powertrains mounted around its periphery. The gear teeth on the bull-gear rotate past the teeth on the pinions, causing the pinions to turn and deliver power to each smaller powertrain. Alternatively, powertrains are attached in a spindle around the perimeter of a main power input drive shaft, and rotate as the shaft rotates. The input drive shaft to each of the smaller powertrain gearboxes is fitted with a pinion. As the main power input shaft turns, the generators, gearboxes and pinions rotate, moving the pinions around the interior of a stationary ring gear. Reduction and distribution of torque is similar to the rotating bull-gear powertrain. In the sun-gear configuration, each smaller powertrain is stationary, reducing stress caused by rotation.

BRIEF DESCRIPTION OF THE DRAWINGS

The invention will be described in detail with reference to the drawings in which.

DESCRIPTION OF THE PREFERRED EMBODIMENTS

Figure 1:
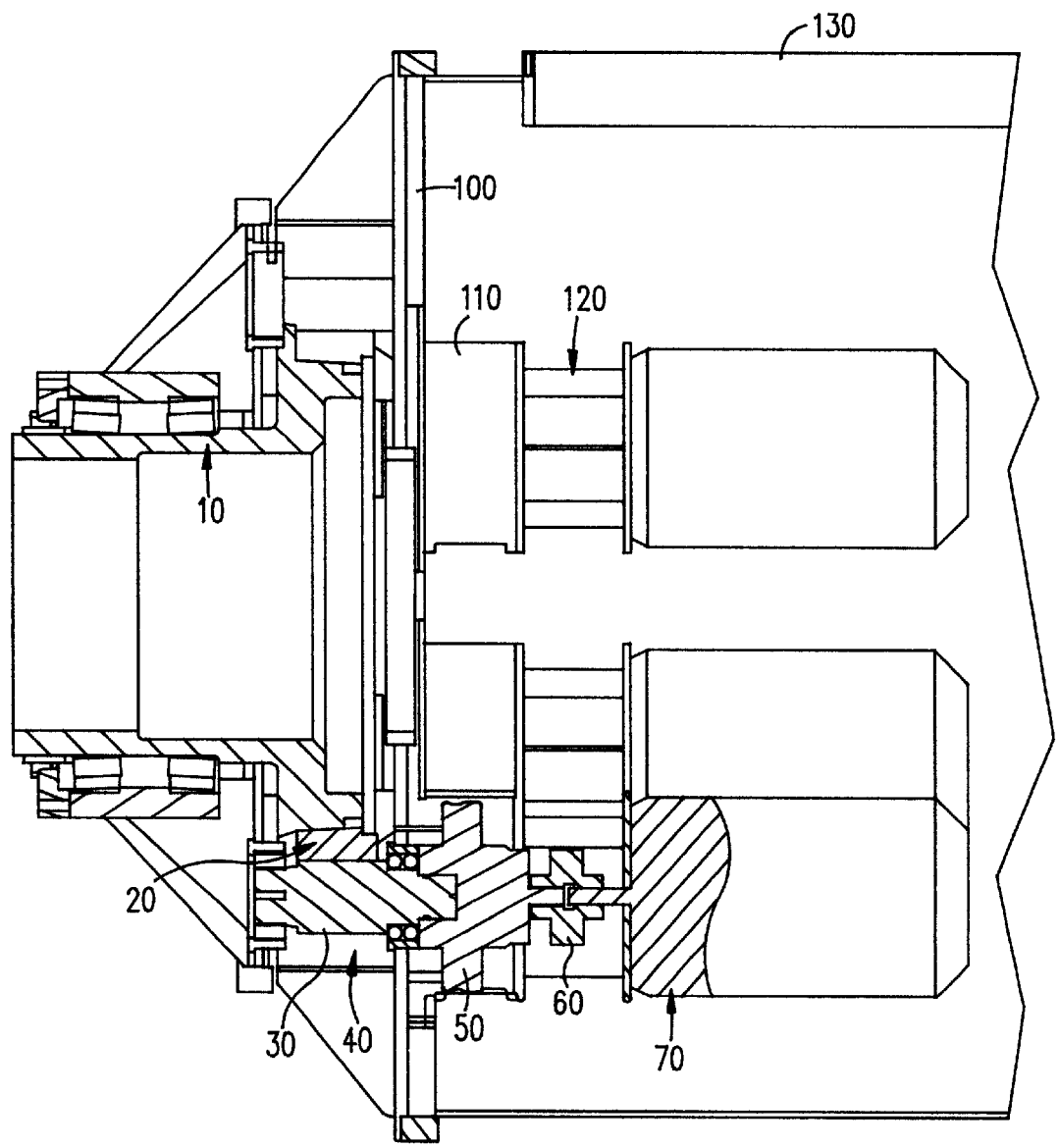
FIG. 1 is a cut-away view of a preferred embodiment of the distributed powertrain of the invention.

FIG. 1 is a cut-away view of the preferred embodiment of the distributed powertrain. Power, supplied by the flow-driven rotation of the rotors, is transmitted into the nacelle by the rotating main shaft 10. A torque-dividing gearbox, comprising a sun gear 20, pressure-mounted on the perimeter of the main shaft and rotating with the shaft, interacts with five pinions 30 mounted around its perimeter, causing them to turn at a rotational rate greater than that of the sun-gear. The chamber 40 in which the sun-gear and pinions rotate is flooded with oil or contains an oil distribution system for lubrication. Each pinion is coupled to the input end of a small torque-reducing gearbox, which increases the rotational speed of the output shaft relative to the pinion. The output shaft of each gearbox is connected by a coupling 60 to a generator 70. Each sub-powertrain consisting of a gearbox 50 and generator 70 is mounted to a circular plate 100 comprising one wall of the oil-filled pinion chamber 40. Each gearbox 50 is held within a plate-mounted gearbox flange 110, to which is mounted a generator flange 120. The generator 70 is then mounted to the generator flange 120. The smaller size of the sub-powertrains relative to conventional larger powertrains allows for easy component handling through a nacelle hatch 130.

Figure 2:
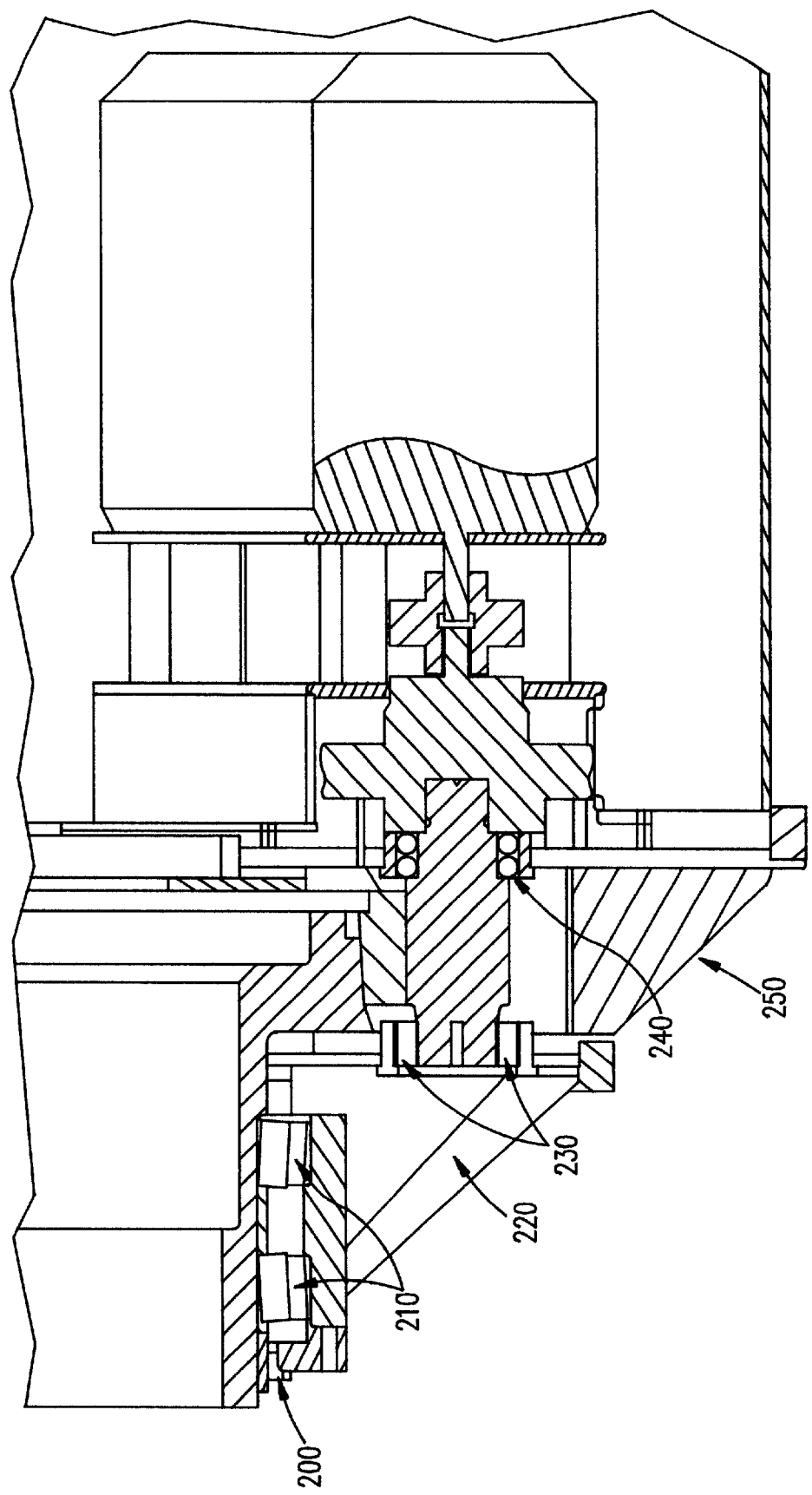
FIG. 2 is a close-up view of the components of the preferred embodiment shown in FIG. 1.

FIG. 2 is a close-up view of the components of the preferred embodiment shown in FIG. 1. A seal 200 prevents water leakage, in the case of a current turbine, or fouling, in the case of a wind turbine, of the roller bearings 210 supporting and allowing rotation of the main shaft. The pinions are held in place by bearings 230, 240. Gussets 220, 250 in the nacelle structure support the loads transferred from the main shaft to the bearings.

Figure 3:
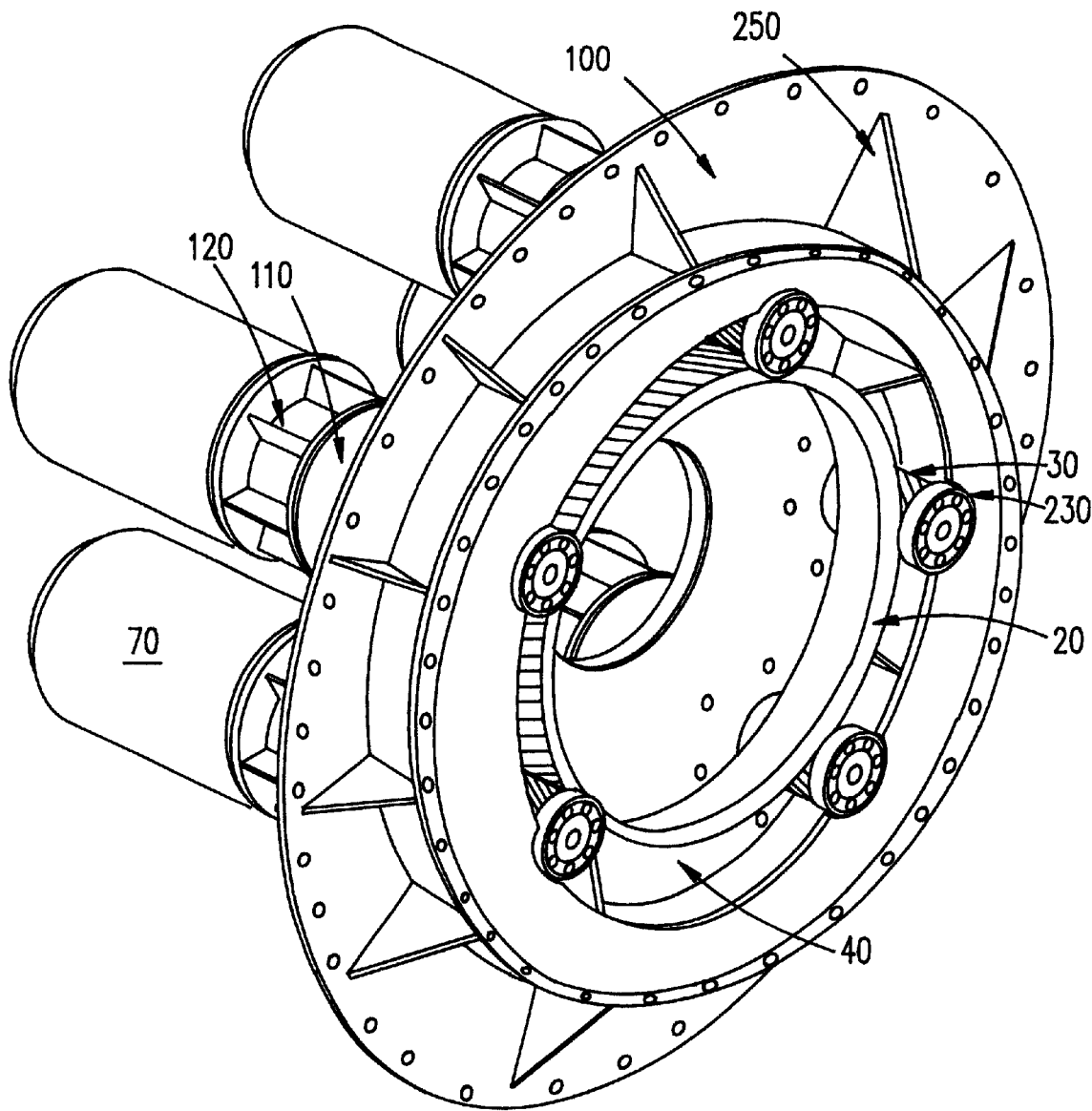
FIG. 3 is an isometric view of the preferred embodiment shown in FIG. 1.

FIG. 3 is an isometric view of the preferred embodiment shown in FIG. 1. This view more clearly illustrates the interaction between the sun-gear 20 and the pinions 30 within the oil-filled chamber 40. The generator, generator flange 110, and gearbox flange 120 are seen to be mounted to the circular plate 100. The pinion bearings 230 are mounted to the walls of the oil-filled chamber 40, which is fortified by structural gussets 250.

Figure 4:
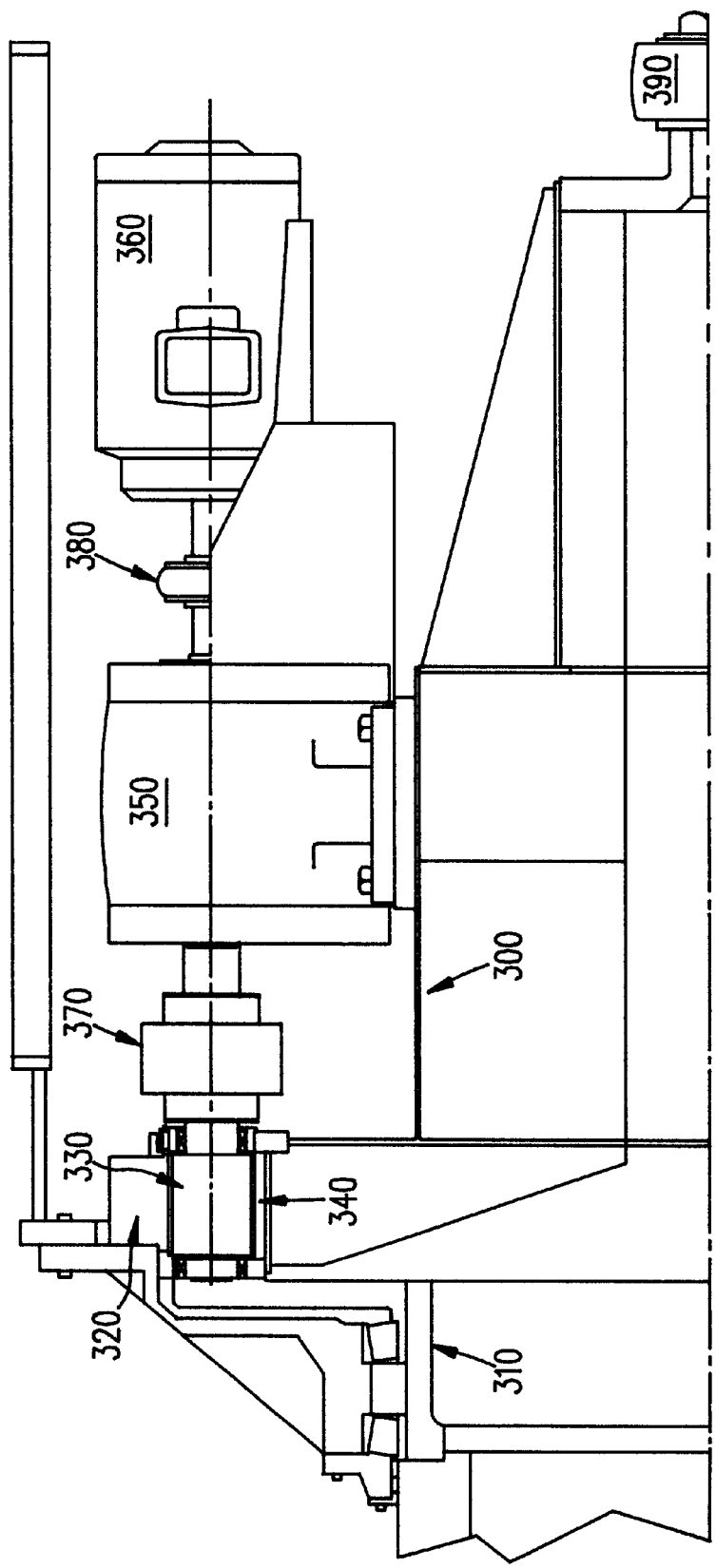
FIG. 4 shows a side view of a single sub-powertrain in an alternate embodiment of the invention.

FIG. 4 shows the side view of a single sub-powertrain in an alternate embodiment of the present invention in which each of the sub-powertrains is mounted on a cylinder 300 that is mounted on the main shaft 310. A torque-dividing gearbox, ring gear 320, is fixed around the inner perimeter of the nacelle. Each of the sub-powertrains is joined via a coupling 370 to a pinion 330. Fluid motion causes the rotors to turn, turning the main shaft and the sub-powertrains mounted to the main shaft. As the sub-powertrain spindle rotates, the pinions move past the ring gear within an oil-filled chamber 340, causing the pinions to rotate faster than the main shaft and supplying input power to the sub-powertrains' gearboxes 350. Each gearbox serves to increase the rotational speed of its output shaft relative to its input shaft. The gearbox output shaft is then joined by a coupling 380 to a generator 360. Conduits carrying electricity generated by the sub-powertrains' generators are gathered within the main shaft and transferred to a non-rotating conductor via a slip-ring 390.

The present invention via a torque-dividing gearbox distributes a high input torque of the rotor 116 between multiple powertrains, each consisting of a smaller conventional torque-reducing gearbox 200 and generator 202. The sum of the power producing capacities of the generators is equal to the maximum power delivered by the power input shaft, and is equivalent to the power produced by a single generator in a conventional system.

If the spindle consists of a number, n, of smaller powertrains, and the gear ratio between the ring gear and the pinion is m, then the torque, τ', delivered to each of the gearboxes is given by $$\tau' = (P/n)/m\omega \quad (2)$$

where P is the total system input power and ω is the rotational velocity of the spindle. It can bee seen that the gearbox input torque, as given in Eq. 1, is reduced by a factor of $(m \times n)^{-1}$. In a system consisting of 6 powertrains, with a ring to pinion gear ratio of 15, torque delivered to each gearbox is reduced to 1.11% ($1/90_{th}$) of the torque of the power input shaft alone.

Figure 5:
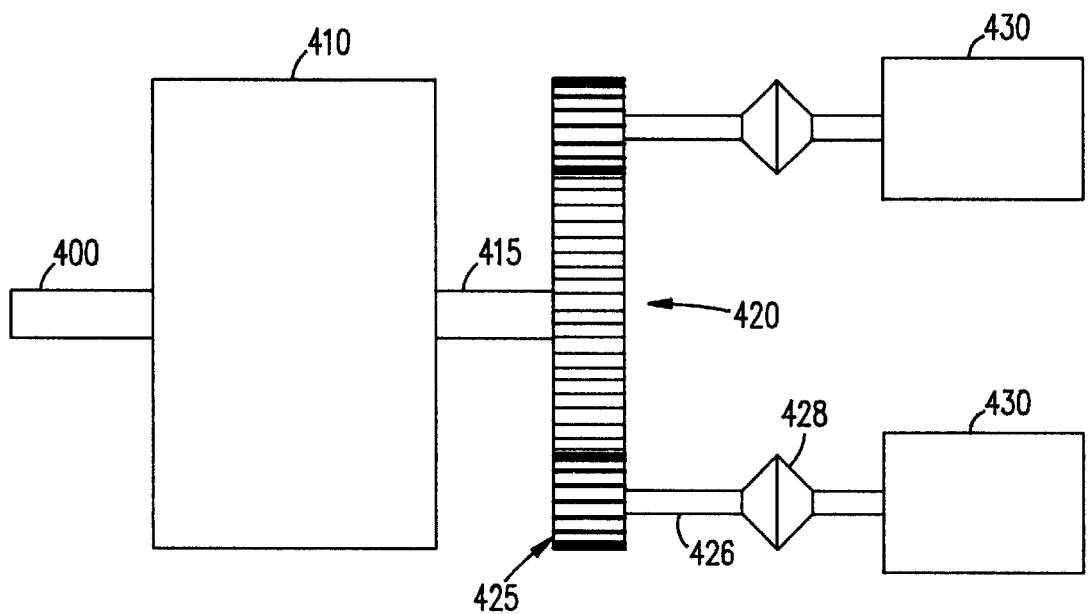
FIG. 5 is a schematic diagram of prior art U.S. Pat. No. 4,691,119, illustrating the placement of a torque-splitting mechanism relative to a reducer.

FIG. 5 is a schematic diagram illustrating prior art (U.S. Pat. No. 4,691,119). This invention couples multiple generators 430 coupled 428 to shafts 426 having pinions 425 around a high-speed (low torque) bull-gear 420 within the gearbox's second stage. The principal function of the prior art patent is to "create an efficient power supply with a controllable output frequency" to improve the quality of generated electricity for use in avionics. The power input is at high RPM, greatly reducing the need for first stage 410 step-up and torque reduction, and therefore reducing the loads applied to the gearbox. A somewhat similar design is used in the prior art shown in U.S. Pat. No. 4,585,950, wherein multiple generators are coupled to the high-speed shaft 415 of a wind turbine gearbox for power quality reasons.

Both of the above prior art designs split the input power at the high-speed end 415 of the gearbox 410, where the input torque applied to each pinion or belt drive is greatly reduced. Instead, the driving shaft upon which the bull-gear or belt drive is located could be simply attached to an external gearbox stage or to a single generator. Present understanding of gearbox and generator pricing teaches that high input speed gearboxes are relatively inexpensive, and that multiple generators cost more than a single large generator. In addition, power electronics have been developed for the functions for which the above prior art patent have been designed. Therefore, present teaching leads away from use of multiple generators divided at the low-speed shaft of a multi-stage gearbox.

Figure 6:
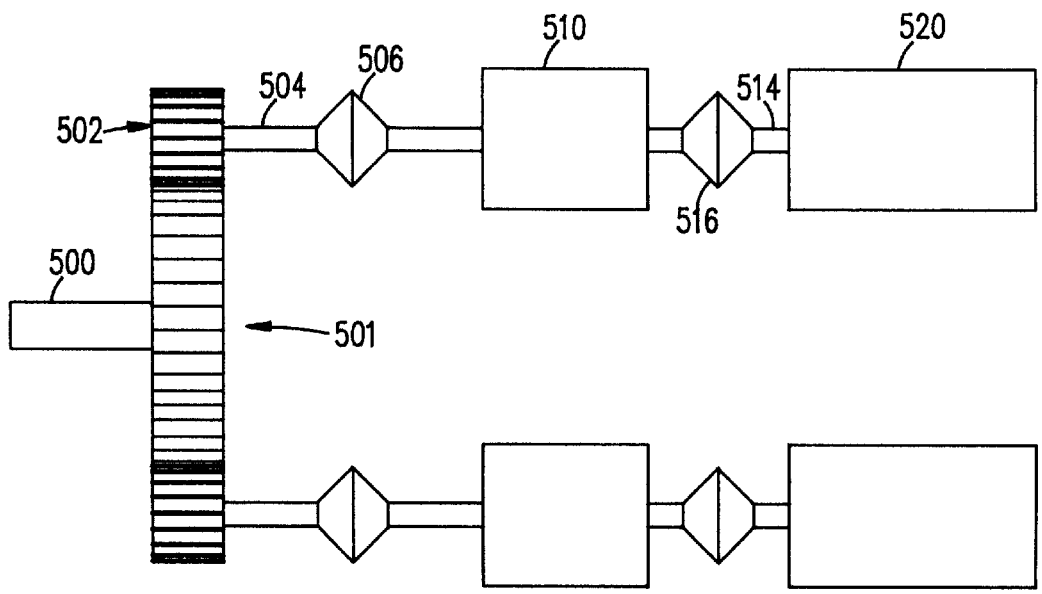
FIG. 6 is a schematic diagram of the present invention for comparison with FIG. 5.

In comparison, FIG. 6 is a schematic diagram of the present invention, which first divides the input torque at the low speed shaft 500 by turning pinions 502 around an input shaft-mounted bull-gear 501 before translating it through shafts 504 and couplings 506 into multiple independent smaller gearboxes 510, which are then coupled 516 via a shaft 514 to small generators 520. The bull-gear 501 and pinions 502 form an effective first stage to the gearbox, while each of the sub-powertrains' gearboxes 510 are self-contained second stages. The first stage need not be a torque-reducing stage. Instead, it may serve as only a torque-splitter, dividing the load between the separate pinions and distributing the contact load between the teeth on the pinions. The diameter of the bull-gear could be the same as the diameter of each pinion, resulting in more of the torque reduction occurring in the individual second stages. The ability to limit the step-up required in the first stage while still resulting in dramatically reduced torque delivered to the second stage results in significant material and associated cost savings.

This invention offers a number of solutions not native to conventional powertrains having a single gearbox and generator:

1. The high torque is split between multiple gearboxes, with the input speed to each benefiting from the 5 to 20:1 step up between the ring gear and the pinions. This enables each of the powertrains to consist of commercially available components, with much higher gearbox input speed. This higher input speed and lower power per powertrain results in greatly reduced input torque. The summed cost of these higher speed, lower torque gearboxes is significantly less than the cost of a single low speed, high torque gearbox. In addition, the summed weight of these smaller gearboxes is significantly less than the weight of a single low speed, high torque gearbox.

2. The parallel powertrains in each nacelle offer an aspect of redundancy that would not be present with a single powertrain, eliminating the single point failure of an individual gearbox and generator. Should one powertrain suffer a fault, it may be taken off line, and the device may continue to generate electricity at a reduced capacity until maintenance is possible.

3. Efficiency may be boosted by taking powertrains off line when they are not required in lower input power periods. Because generators typically suffer greater efficiency reductions when operating below nominal power input, taking several powertrains off line may allow the remaining powertrains to operate nearer to their optimal efficiency. For instance, if a 750 kW turbine consisted of ten 75 kW systems, then two systems (opposite each other in the ring of powertrains for load balancing) could be taken off line when power production dips below 80%, allowing the remaining generating systems to remain nearer optimal generating efficiency. Typical efficiency gains may be from 1 to 5%, or 20 to 80% reduction in generator losses.

4. Generator and gearbox cooling may benefit from the reduced mass of individual components and from the spacing of components yielding additional air circulation.

5. Many of the smaller generating systems available are robustly designed and have very strong performance records, which may help to reduce powertrain faults and expensive maintenance time.

6. Each powertrain is significantly less massive than a single large powertrain, and may therefore be handled more easily. A significant portion of O&M costs for wind and current turbines come from rental of heavy lifting equipment such as cranes. Because the size of individual components is reduced, the size of the required equipment and the associated costs may be reduced.

7. Access for maintenance, removal, or replacement is facilitated by the revolving spindle of powertrains. The spindle may be rotated a fraction of a revolution, exposing each powertrain to a single access hatch in the device casing.

8. The main sun or ring gear and the pinions may be installed to rotate in either direction. This allows for manufacturing and grinding of one set of gearing regardless of the direction of rotation of the main shaft. For some applications it may be advantageous for turbines to rotate in one direction or the other. Because conventional gearboxes are typically designed to rotate in one direction only, two separately designed and manufactured gearboxes would otherwise be required to allow selection of operating direction.

9. The present invention may be used in conjunction with a fixed pitch, variable speed wind turbine concept. Torque control on the generator may be combined with power electronics to modulate speed. To apply this successfully, a low contact stress gearbox design, such as the present invention, is required in order to handle the associated load excursions.

10. The present invention may allow maximizing of aerodynamic efficiency in wind turbines. Given the high gear ratios achievable with the present invention in a relatively light and compact configuration, the wind turbine rotor can be operated at lower rotational speeds, which allows for reduction in the blades' tip speed ratio. Operating at a reduced tip speed ratio allows for reduction in blade noise, for reduction in blade surface erosion, and for increases in aerodynamic efficiency due to reduced drag and tip losses.

While the invention has been particularly shown and described with reference to preferred embodiments thereof, it will be understood by those skilled in the art that the foregoing and other changes in form and detail may be made therein without departing from the scope of the invention.

What is claimed is:

1. An electric power-generating device that converts fluid flow of wind or water to electricity comprising:

a rotor having blades that rotate in response to fluid flow;

a main power input shaft coupled to said rotor;

a single-stage torque-dividing gearbox coupled to said main power input shaft;

said torque-dividing gearbox having a plurality of output shafts located around a perimeter of said main power input shaft; and, a plurality of sub-powertrains, each one of said sub-powertrains including a generator coupled to a respective one of said torque-dividing gearbox output shafts.

2. The electric power-generating device of claim 1 wherein said torque-dividing gearbox includes a stationary ring gear having ring gear teeth around an inner circumference of said ring gear; each one of said torque-dividing gearbox output shafts being connected to a gear that engages said ring gear teeth.

3. The electric power-generating device of claim 1 wherein said torque-dividing gearbox includes a bull gear, each one of said torque-dividing gearbox output shafts being connected to a gear that engages said bull gear teeth.

4. The electric power-generating device of claim 1 wherein said plurality of sub-powertrains are held stationary with respect to said main power input shaft and said torque-dividing gearbox includes a bull gear, each one of said torque-dividing gearbox output shafts being connected to a gear that engages said bull gear teeth.

5. The electric power-generating device of claim 1 wherein said plurality of sub-powertrains are connected to said main power input shaft such that said plurality of sub-powertrains are free to rotate with said main power input shaft and said torque-dividing gearbox includes a ring gear having ring gear teeth around an inner circumference of said ring gear; each one of said torque-dividing gearbox output shafts being connected to a gear that engages said ring gear teeth.

6. The electric power-generating device of claim 1 wherein said torque-dividing gearbox comprises:

a ring gear held stationary with respect to said main power input shaft;

said ring gear having ring gear teeth around an inner circumference of said ring gear;

each input shaft of said plurality of sub-powertrains being connected to a pinion that engages sad ring gear teeth such that as said main power input shaft turns, said sub-powertrains and pinions rotate with said main power input shaft.

7. The electric power-generating device of claim 1 wherein said plurality of sub-powertrains are held stationary with respect to said main power input shaft and said torque-dividing gearbox comprises:

a rotating bull gear;

each input shaft of said plurality of sub-powertrains being connected to a pinion that engages said bull gear such that as said main power input shaft turns, said bull gear rotates causing said pinions to turn, driving said sub-powertrains.

8. The electric power-generating device of claim 1 wherein said plurality of sub-powertrains are connected by a spindle to said main power input shaft and said torque-dividing gearbox comprises:

a stationary ring gear;

each input shaft of said plurality of torque-reducing gearboxes being connected to a pinion that engages said ring gear such that as said main power input shaft turns, said spindle rotates causing said pinions to turn, driving said sub-powertrains.

9. An electric power-generating device that converts fluid flow of wind or water to electricity comprising:

a rotor having blades that rotate in response to fluid flow;

a main power input shaft coupled to said rotor;

a single-stage torque-diving gearbox coupled to said main power input shaft; and, a plurality of sub-powertrains, each including a generator having an input shaft connected to said torque-diving gearbox, said plurality of sub-powertrains, being located around a perimeter of said main power input shaft.

10. The device of claim 9 wherein at least one of said sub-powertrains includes a torque-reducing gearbox driving a generator.

11. The device of claim 10 wherein said torque-dividing gearbox includes a stationary ring gear about which said plurality of sub-powertrains rotate.

12. The device of claim 10 wherein said torque-dividing gearbox includes a bull gear which drives said plurality of sub-powertrains.

13. The device of claim 10 wherein said plurality of sub-powertrains are held stationary with respect to said main power input shaft and said torque-dividing gearbox includes a bull gear connected to said main power input shaft.

14. The device of claim 10 wherein said plurality of sub-powertrains are free to rotate with said main power input shaft and said torque-dividing gearbox includes a ring gear around said perimeter os said main power input shaft, said ring gear being engaged by each said input shaft.

15. The device of claim 9 wherein said torque-dividing gearbox comprises:

a ring gear held stationary with respect to said main power input shaft;

each input shaft of said plurality of sub-powertrains being connected to a pinion that engages said ring gear, said sub-powertrains and pinions being free to rotate around said perimeter of said main power input shaft.

16. The device of claim 10 wherein said torque-dividing gearbox comprises:

a ring gear held stationary with respect to said main power input shaft;

each input shaft of said plurality of sub-powertrains being connected to a pinion that engages said ring gear, said sub-powertrains and pinions being free to rotate around said perimeter of said main power input shaft.

17. The device of claim 10 wherein said plurality of sub-powertrains are held stationary with respect to said main power input shaft and said torque-dividing gearbox comprises:

a rotating bull gear;

each input shaft of said plurality of sub-powertrains being connected to a pinion that engages said bull gear.

18. The device of claim 10 wherein said plurality of sub-powertrains are connected to said main power input shaft, said plurality of generators and torque-reducing gearboxes being free to rotate with said main power input shaft, said torque-dividing gearbox comprising:

a ring gear;

each input shaft of said plurality of sub-powertrains being connected to a pinion that engages said ring gear, said sub-powertrains and pinions being free to rotate around said perimeter of said main power input shaft.

19. The device of claim 2 wherein said torque-dividing gearbox is housed in a nacelle and said ring gear is fixed around an inner perimeter of said nacelle.

20. The device of claim 3 wherein said torque-dividing gearbox is housed in a nacelle that provides a portion of a structural casing for said bull gear.

21. The device of claim 6 wherein said torque-dividing gearbox is housed in a nacelle and said ring gear is fixed to an inner perimeter of said nacelle.

22. The device of claim 7 wherein said torque-dividing gearbox is housed in a nacelle that provides a portion of a structural casing for said bull gear.

23. The device of claim 11 wherein said torque-dividing gearbox is housed in a nacelle and said ring gear is fixed to an inner perimeter of said nacelle.

24. The device of claim 12 wherein said torque-dividing gearbox is housed in a nacelle that provides a portion of a structural casing for said bull gear.

25. The device of claim 14 wherein said torque-dividing gearbox is housed in a nacelle and said ring gear is fixed to an inner perimeter of said nacelle.

26. The device of claim 16 wherein said torque-dividing gearbox is housed in a nacelle and said ring gear is fixed to an inner perimeter of said nacelle.

27. The device of claim 17 wherein said torque-dividing gearbox is housed in a nacelle that provides a portion of a structural casing for said bull gear.

28. The electric power-generating device of claim 1 wherein at least one of said sub-powertrains includes a torque-reducing gearbox coupled in series between a torque-diving gearbox output shaft and a generator.

29. The electric power-generating device of claim 2 wherein at least one of said sub-powertrains includes a torque-reducing gearbox coupled in series between a torque-dividing gearbox output shaft and a generator.

30. The electric power-generating device of claim 3 wherein at least one of said sub-powertrains includes a torque-reducing gearbox coupled in series between a torque-dividing gearbox output shaft and a generator.

* * * * *